US011375683B2

(12) United States Patent
Earls

(10) Patent No.: US 11,375,683 B2
(45) Date of Patent: Jul. 5, 2022

(54) BARRIER COMPONENTS FOR ANIMAL STALLS

(71) Applicant: Michael Earls, Athenry (IE)

(72) Inventor: Michael Earls, Athenry (IE)

(73) Assignee: Michael Earls, Athenry (IE)

( * ) Notice: Subject to any disclaimer, the term of this patent is extended or adjusted under 35 U.S.C. 154(b) by 49 days.

(21) Appl. No.: 16/933,027

(22) Filed: Jul. 20, 2020

(65) Prior Publication Data

US 2020/0344973 A1 Nov. 5, 2020

Related U.S. Application Data

(62) Division of application No. 14/568,504, filed on Dec. 12, 2014, now Pat. No. 10,736,298.

(30) Foreign Application Priority Data

Dec. 13, 2013 (GB) .................................... 1322068

(51) Int. Cl.
*A01K 1/00* (2006.01)
(52) U.S. Cl.
CPC .................................. *A01K 1/0011* (2013.01)
(58) Field of Classification Search
CPC ........ A01K 1/00; A01K 1/005; A01K 1/0011; A01K 1/0029; A01K 1/0023; Y10T 403/45; Y10T 403/54; Y10T 403/55
See application file for complete search history.

(56) References Cited

U.S. PATENT DOCUMENTS

| 1,142,246 | A | * | 6/1915 | Gagan | A01K 1/0005 |
| | | | | | 119/523 |
| 2,080,627 | A | * | 5/1937 | Morgan | F16D 3/74 |
| | | | | | 464/87 |
| 2,447,697 | A | | 8/1948 | Gotschall | |
| 2,449,265 | A | | 9/1948 | Williams | |
| 3,473,833 | A | | 10/1969 | Bremer | |

(Continued)

FOREIGN PATENT DOCUMENTS

| EP | 2497356 A1 | 9/2012 |
| FR | 2781331 B1 | 8/2000 |

(Continued)

OTHER PUBLICATIONS

"Green Cubicle with Rubber Loop" downloadable at http://web.archive.org/web/20140918042259 available at least as of Nov. 5, 2015.

(Continued)

*Primary Examiner* — Daniel J Wiley
(74) *Attorney, Agent, or Firm* — Warner Norcross + Judd LLP

(57) ABSTRACT

A barrier component is disclosed for an animal stall, comprising a curved, elongated body member of elastomeric material such as rubber. This body member has first and second end sections each adapted for engagement within a respective hollow pipe. Together the two hollow pipes and the barrier component provide a stall divider when mounted on a suitable set of brackets, poles or supports at the head end of a stall. The component has a collar formation at each end which defines an annular recess for receiving a hollow pipe end and shielding the end of the pipe from the animal.

8 Claims, 4 Drawing Sheets

(56) References Cited

U.S. PATENT DOCUMENTS

| | | | |
|---|---|---|---|
| 3,520,561 A | 7/1970 | Rininger | |
| 3,986,481 A * | 10/1976 | Gloggler | A01K 1/0011 |
| | | | 119/523 |
| 4,173,989 A | 11/1979 | Prest | |
| 4,220,316 A | 9/1980 | Naka et al. | |
| 4,602,766 A | 7/1986 | Naka et al. | |
| 4,603,904 A * | 8/1986 | Tolleson | A47C 7/44 |
| | | | 297/296 |
| 4,646,490 A | 3/1987 | Naka et al. | |
| 4,899,989 A | 2/1990 | Kitson et al. | |
| 4,942,965 A * | 7/1990 | Comer | B65D 71/70 |
| | | | 206/419 |
| 5,230,299 A * | 7/1993 | Moreau | A01K 1/12 |
| | | | 119/14.03 |
| 5,333,922 A | 8/1994 | Jones | |
| 5,857,664 A * | 1/1999 | Schauman | E04H 17/1413 |
| | | | 256/19 |
| 5,975,026 A | 11/1999 | Rudolph | |
| 6,328,047 B1 * | 12/2001 | Lee | A45B 17/00 |
| | | | 135/15.1 |
| 7,469,659 B2 * | 12/2008 | de Jonge | A01K 1/0011 |
| | | | 119/523 |
| 7,520,492 B1 | 4/2009 | Lai | |
| 2002/0011218 A1 | 1/2002 | Rudolph | |
| 2011/0023788 A1 * | 2/2011 | Beechie | B60R 21/026 |
| | | | 119/172 |
| 2015/0322716 A1 * | 11/2015 | Wollesen | A01K 29/00 |
| | | | 119/63 |

FOREIGN PATENT DOCUMENTS

| | | |
|---|---|---|
| GB | 1380414 A | 1/1975 |
| WO | 2012164549 A1 | 12/2012 |

OTHER PUBLICATIONS

European Search Report for EP 14197508, the European counterpart to U.S. Appl. No. 14/568,504.

* cited by examiner

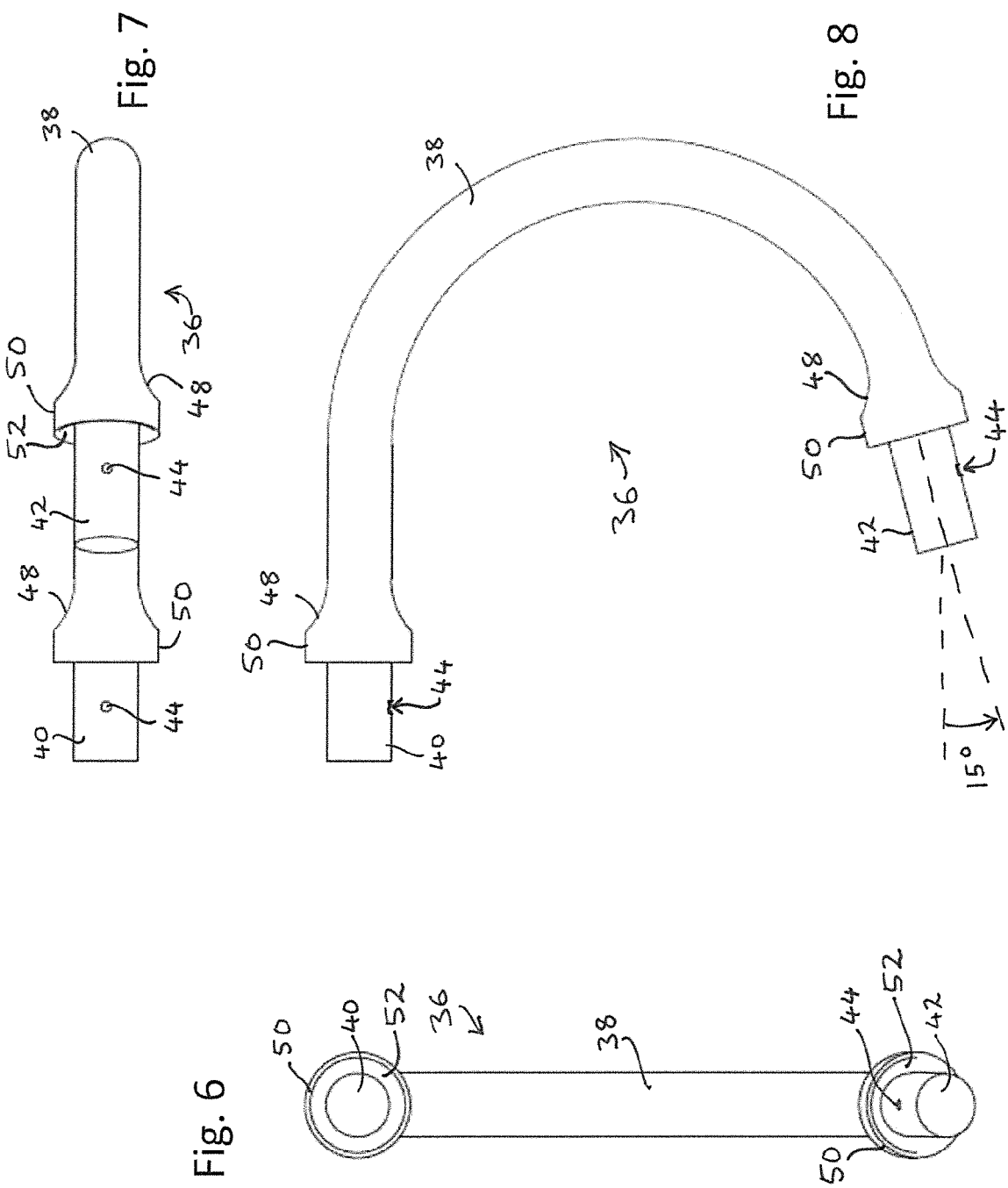

BARRIER COMPONENTS FOR ANIMAL STALLS

This application is a divisional application of U.S. patent application Ser. No. 14/568,504, filed Dec. 12, 2014, by inventor Michael Earls, entitled BARRIER COMPONENTS FOR ANIMAL STALLS, which claims priority to United Kingdom application 1322068.6, filed Dec. 13, 2013.

TECHNICAL FIELD

This invention relates to stalls or cubicles for animals.

BACKGROUND ART

Farm animals are frequently accommodated indoors using stalls (also referred to as cubicles or pens; the term "stalls" will be used herein). One common design of stall has a common head barrier or wall with parallel dividers projecting out to define individual spaces for animals between a pair of adjacent dividers.

Typical steel stall dividers are a basic U shape made of one piece of steel tubing bent to make the U shape. The ends of the "U" are mounted to the head end barrier (i.e. with the "U" lying on its side) and with the bottom of the "U" projecting outwards. These dividers cause injuries to the animals.

One solution is to replace the stainless steel divider with a pair of flexible plastic pipes, replacing the upper and lower rails of the steel "U" shape. Easyfix Limited, of Ballinasloe, Ireland supply such a product employing hollow polypropylene random (PP-R) co-polymer pipes, which provide a safe replacement for the conventional steel stall dividers and eliminate possible injuries to animals.

One problem encountered with this solution was that because the PP-R pipe stall system uses two open ended pipes, when young animals or animals, which were not used to a stall system, first entered the stall there was a chance of them being able to turn around in the stall and end up facing the wrong way.

It is not practical to bend an extruded PP-R pipe into a U-shape as the pipe has to be heated evenly all the way through its 12.5 mm wall thickness. This would require a huge oven capable of taking several 4 meter lengths of pipe and then bending them in a press big enough to press them into shape and hold that shape while they cooled. Such a process would be cost prohibitive.

A further drawback of recreating the steel U-shape with PP-R material is that the resultant product loses the flexibility inherent in having a pair of pipes freely projecting from a single mounting point. If created in a U shape, the PP-R pipe would be too rigid a product.

DISCLOSURE OF THE INVENTION

In a first aspect there is provided a barrier component for an animal stall, comprising:
a curved, elongated body member of elastomeric material, the body having first and second end sections;
the first end and the second end sections each being adapted for engagement within a hollow pipe; and
a collar formation adjacent the first end or the second end which defines an annular recess for receiving a hollow pipe end.

Creating a barrier component, for fitting to a pair of hollow pipe ends, from an elastomeric material, provides a number of benefits.

A U-shaped barrier can be created from a pair of light-weight polymer (e.g. PP-R) pipes which are mounted to a head end mounting such as a head-end barrier or a wall bracket, and the barrier component of the invention, resulting in a divider which is significantly less rigid than either a steel U section or a U shaped barrier formed of PP-R pipe (or similar polymers).

The component allows the two existing pipes to flex almost independently of one another and it also brought an added safety factor for the animals in that there is absolutely no danger of the animals getting bruised when entering the stall, or even if they brush past the outside of the stall while using the access passageway.

The component also prevents injury to the animals in the stall as it will stretch if an animal is panicked while in the stall. Additionally it is practical and cost effective to manufacture and can be attached relatively simply using bolts or other fasteners that can be simply passed through the plastic pipe and the ends of the component received in the pipe.

The collar provides an annular recess which accommodates the end of the pipes and thereby protects the animal when entering the stall from injury against the edge of the pipe ends, and also prevents animals from using the pipe end as a scratching post. Furthermore, by accommodating the pipe end within the recess, dirt is prevented from entering the pipe.

The collar serves the further function of continuing to protect the pipe end even if the component is severely stretched.

Preferably, said curved, elongated body subtends an angle of between 90 and 220 degrees, more preferably 140 and 180 degrees, even more preferably between 150 and 175 degrees.

Preferably, said body is generally cylindrical along its length and has a first diameter in a middle section thereof, the first and second ends having a second diameter which is less than the first diameter.

The middle section preferably occupies the major part of the length of the component.

Preferably, the collar comprises a flared formation which increases in diameter towards the end section to which it is adjacent.

Preferably, the flared formation increases in diameter from the first diameter where it merges with the middle section to a third diameter greater than the first diameter, the increase in diameter being continuous rather than abrupt.

Preferably, the collar further comprises an annular skirt projecting axially from the flared section towards the end section to which the collar is adjacent, the skirt and the end section defining between them said annular recess.

Most preferably, two of said collars are provided, one adjacent each end section. The end sections are preferably provided with a through hole to receive a locking member. In a preferred embodiment, the elastomeric material is vulcanised moulded rubber.

There is also provided a barrier assembly for an animal stall comprising the barrier component described above, and first and second pipes each having a hollow free end, wherein the free ends of the first and second pipes receive a respective one of the first and second ends of the barrier component, such that the curved elongated body member connects the first and second pipes.

There is further provided an animal stall assembly comprising a plurality of said barrier assemblies mounted parallel to one another along a central barrier such that the barrier assemblies are spaced apart from one another and each adjacent pair of barrier assemblies defines a respective animal stall, the first and second pipes of each barrier assembly being generally mounted one above the other and the barrier component of each barrier assembly being disposed at an outer end of the stall away from the central barrier.

In a further, independent aspect of the invention, there is provided a stall divider for animal stalls, comprising:

first and second pipes each having a head end adapted for mounting on a fixed head-end barrier, whereby in use said pipes extend from said head end to a free end, the pipes lying within and defining a substantially vertical plane which separates a pair of neighbouring stalls; and a connecting member comprising a curved length of flexible material having first and second ends, the first and second ends being adapted for mounting in the free ends of the first and second pipes, respectively.

Preferably, said first and second pipes are made of PP-R (polypropylene random copolymer).

The connecting member preferably comprises a solid flexible tube extending in a curved fashion from the free end of the first pipe to the free end of the second pipe.

Preferably, the connecting member is secured to the free ends by being inserted into a hollow terminal portion at the free end of each pipe, and being secured by a bolt extending through the free end and the connecting member.

BRIEF DESCRIPTION OF THE DRAWINGS

The invention will be further illustrated by the following description of embodiments thereof, given by way of example only with reference to the accompanying drawings, in which:

FIG. 6 is a rear elevation of the barrier component of FIG. 3;

FIG. 7 is a plan view from below of the barrier component of FIG. 3; and

FIG. 8 is a side elevation of the barrier component of FIG. 3.

In FIG. 1 there is indicated, generally at 10, an animal house layout containing an animal stall assembly 12 with a plurality of animal stalls 14 arranged in two rows 16, 18.

Figure 1:
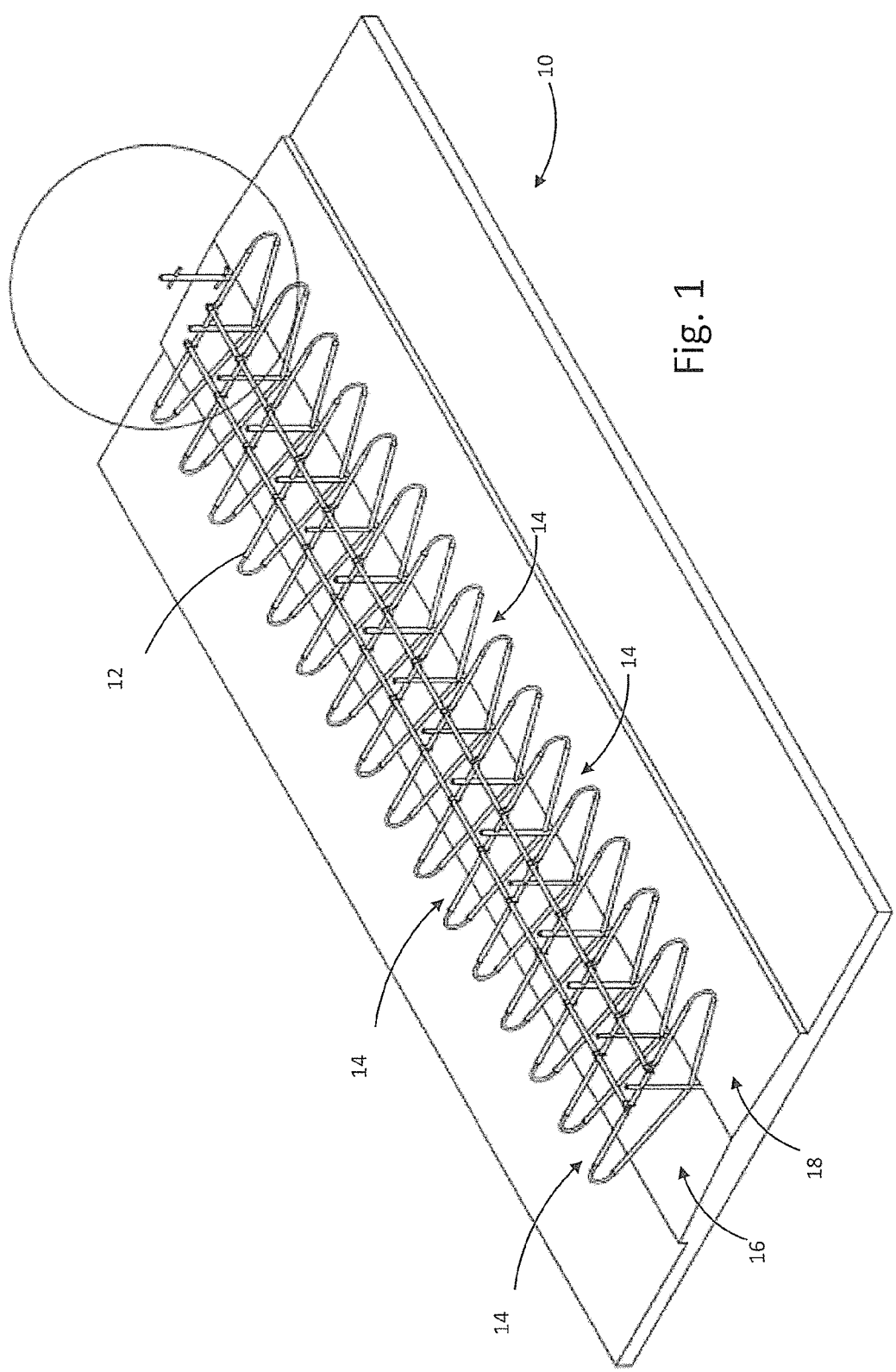
FIG. 1 is a perspective view of a layout of an animal house containing a set of stalls.
Figure 2:
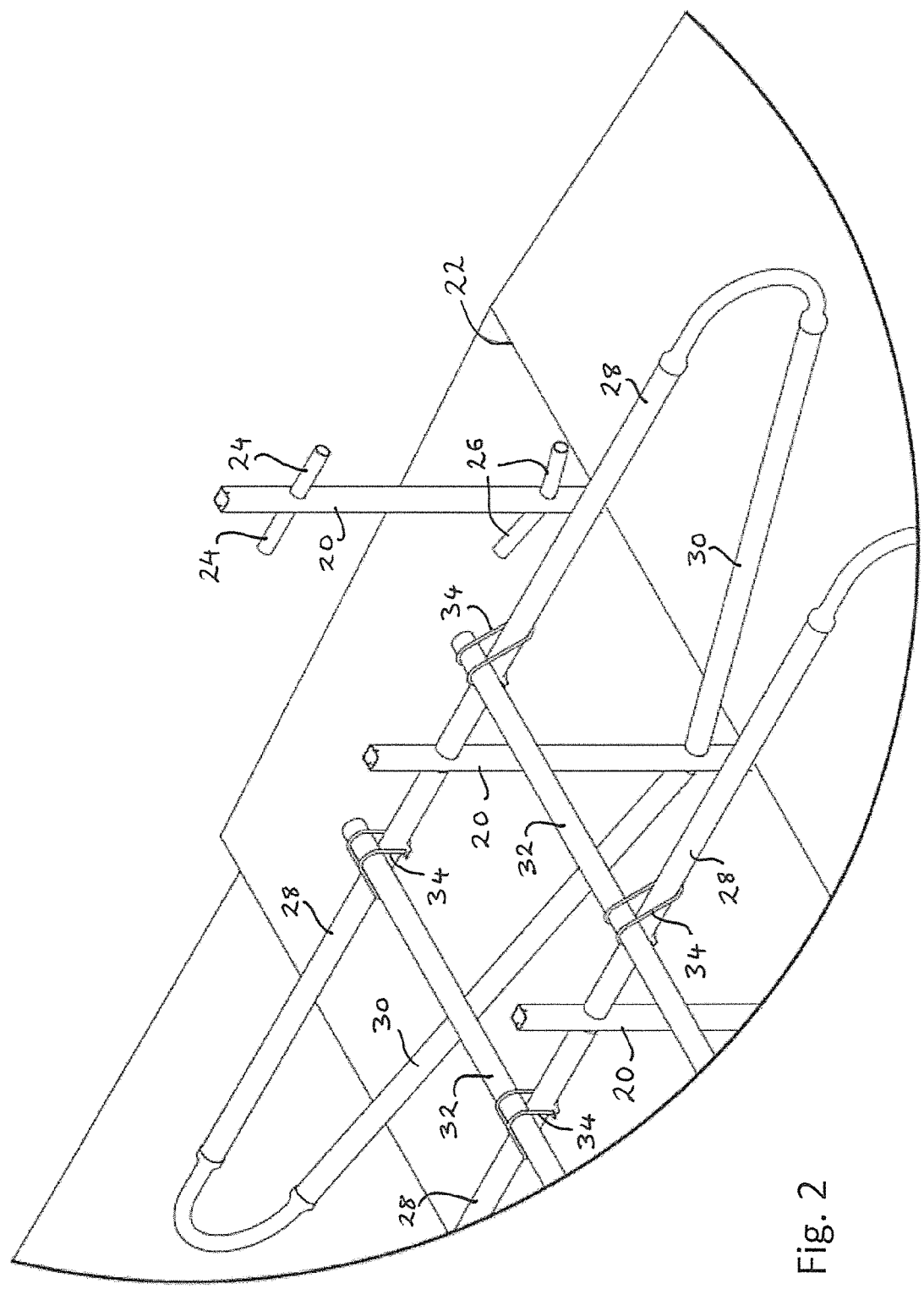
FIG. 2 is a detail of FIG. 1.

Referring additionally to FIG. 2, a detail of the FIG. 1 layout is shown, including a series of cubicle posts 20 mounted along a centre line 22 of the animal house. The endmost post 20 is shown without any barrier or stall divider, and it can be seen that the post is provided with a pair of upper mounting posts 24 and a pair of lower mounting posts 26. As seen with the next adjacent post 20, the upper mounting posts (not visible) are used to each mount a respective upper barrier pole 28 which extend horizontally outward from one another, while the lower mounting posts (not visible) are used to each mount a respective lower barrier pole 30 which extend outward from one another in the same vertical plane as the upper posts 28, but inclined upwardly at an angle of 15 degrees.

Lengthwise head-end rails, known as neckrails 32, are tied to the top of the upper barrier poles 28 by a series of steel neckrail clamp brackets 34, such that the pair of neckrails 32 run in parallel along the head-end of each row 16, 18 of stalls 14 (FIG. 1). (As used herein the term "head-end" refers to the part of the stall nearest to the centre line 22, as opposed to the "open end" into which the animal enters a stall.)

Connecting the upper barrier pole 28 and lower barrier pole 30 of each stall divider or barrier assembly is a generally C-shaped barrier component 36, with the barrier assembly comprising a connected pair of poles 28, 30 and the component 36. It can be seen that the ends of the "C" shape are mated with the poles 28, 30 at the open end of the stalls. The poles are either hollow along their length or hollow at the end section to receive an end section of the component 36, which will now be described in greater detail.

Figure 5:
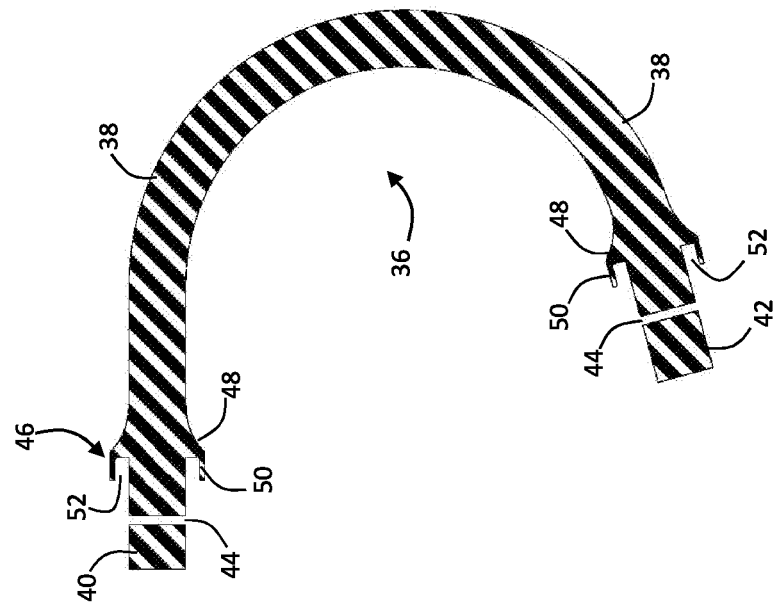
FIG. 5 is a sectional elevation of the barrier component of FIG. 3, along the line V-V in FIG. 4.
Figure 4:
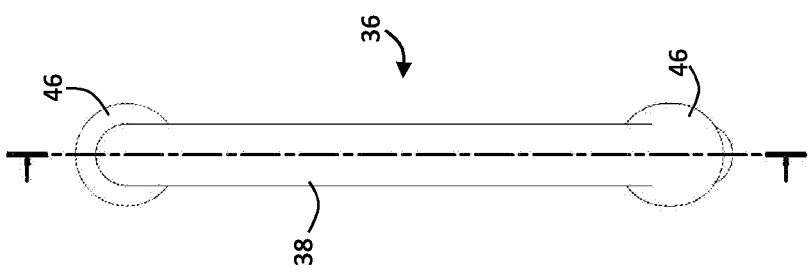
FIG. 4 is a front elevation of the barrier component of FIG. 3.
Figure 3:
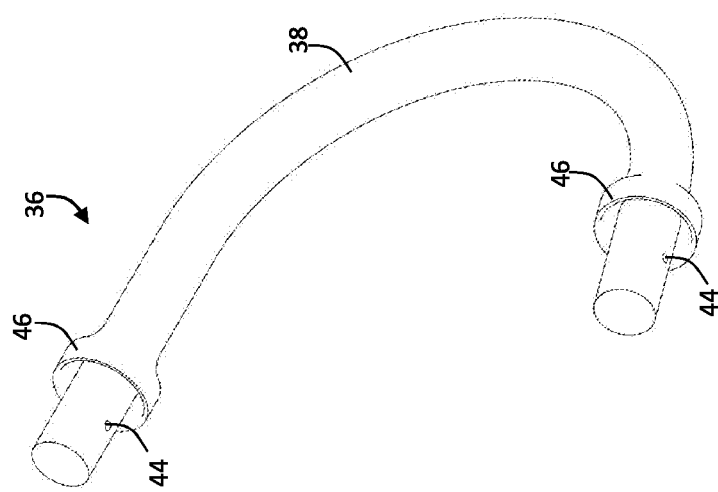
FIG. 3 is a perspective view of a barrier component of one animal stall divider assembly.

Referring to FIG. 3-8, the barrier component 36 is shown in perspective (FIG. 3), from the front, rear, below and one side (FIGS. 4, 6, 7 and 8, respectively), and in FIG. 5 in cross section taken along the line V-V in FIG. 4.

The component 36 comprises a curved, elongated body member made of vulcanised, moulded rubber (though other flexible elastomers can be used). The body member has a middle section 38 which is curved into an arc and which occupies the major part of the length of the generally cylindrical curved body 36. The arc subtends an angle of 165 degrees, such that its upper end 40 is offset from its lower end 42 by an angle of 15 degrees, as seen in FIG. 8, matching the offset of the poles 28, 30.

Each of the end sections ends 40, 42 is provided with a through hole 44 allowing it to be secured in place within its respective pole 28, 30 using a bolt (not shown) which passes through a corresponding pair of holes (not shown) in the pole. The diameter of the end sections 40, 42 is dimensioned to make a snug fit with the interior diameter of the hollow ends of the poles. The diameter of the middle section is approximately the same as the outside diameter of the poles.

Between the middle section 38 (having a first diameter) and the each of the ends 40, 42 (having a second diameter less than the first diameter), is a collar formation 46 which has a flared formation 48 (FIG. 5) that increases in diameter towards the end section to which it is adjacent from the first diameter where it merges with the middle section to a third diameter greater than the first and second diameters. An annular skirt 50 projects axially from the flared formation 48 towards the end section 40, 42 to which the collar is adjacent. The skirt 50 and the end section 40, 42 define between them an annular recess 52 which is dimensioned to receive the end of the pipe or pole 28, 30 onto which the component is mounted.

When the component 36 is mounted on a pair of poles 28, 30, the collar shields the pole ends and provides a continuous rather than abrupt transition. The resulting assembly is flexible and designed to avoid injuring the animals, while overcoming the disadvantages of known prior art systems as described earlier.

The invention is not limited to the embodiments described which can be modified without departing from the scope of the claimed invention.

I claim:

1. A farm animal stall divider for a farm animal stall, the farm animal stall having a fixed post forming a fixed head-end barrier of the farm animal stall, the farm animal stall divider comprising:

first and second pipes each having a head end adapted for removably mounting on the fixed post of the fixed head-end barrier of the farm animal stall, whereby in use said pipes extend from said head end to a free end, the pipes lying within and defining a substantially vertical plane which separates a pair of neighbouring farm animal stalls; and a connecting member comprising a curved length of flexible material having first and second ends, the first and second ends being adapted for mounting in the free ends of the first and second pipes, respectively.

2. A farm animal stall divider according to claim 1, wherein said first and second pipes are made of PP-R (polypropylene random copolymer).

3. A farm animal stall divider according to claim 1, wherein said connecting member comprises a solid flexible tube extending in a curved fashion from the free end of the first pipe to the free end of the second pipe.

4. A farm animal stall divider according to claim 1 wherein said connecting member is secured to the free ends by being inserted into a hollow terminal portion at the free end of each pipe, and being secured by a bolt extending through the free end and the connecting member.

5. A farm animal stall divider according to claim 1, wherein the fixed post comprises a fixed vertical post and includes an upper mounting post and a lower mounting post, and the head ends of the first and second pipes are configured to removably mount to the fixed vertical post using the upper and lower mounting posts.

6. A farm animal stall divider according to claim 1, wherein said head ends of said first and second pipes comprise open ends to each receive a portion of the fixed post therein.

7. A farm animal stall divider according to claim 6, wherein the fixed post comprises a fixed vertical post and includes an upper mounting post and a lower mounting post, and the open ends of the first and second pipes are positioned to receive the upper and lower mounting posts to thereby mount the farm animal stall divider to the fixed post.

8. A farm animal stall divider according to claim 1, wherein said connecting member is formed from a flexible elastomer.

* * * * *